Aug. 27, 1957 L. R. KIRKWOOD 2,804,496

BACKGROUND CONTROL FOR COLOR TELEVISION RECEIVER

Filed Feb. 12, 1952 2 Sheets-Sheet 1

INVENTOR
Loren R. Kirkwood
BY
ATTORNEY

BACKGROUND CONTROL FOR COLOR TELEVISION RECEIVER
Filed Feb. 12, 1952 2 Sheets-Sheet 2
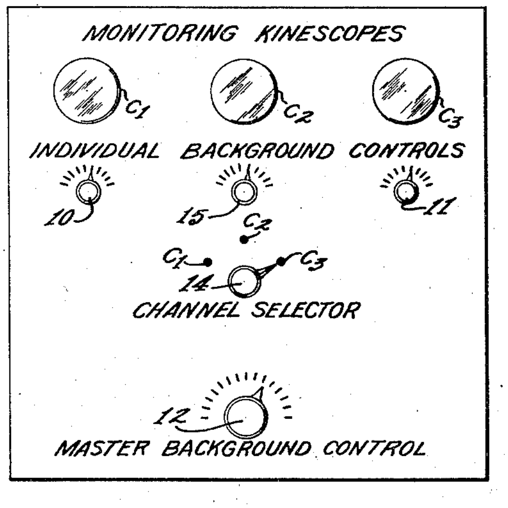
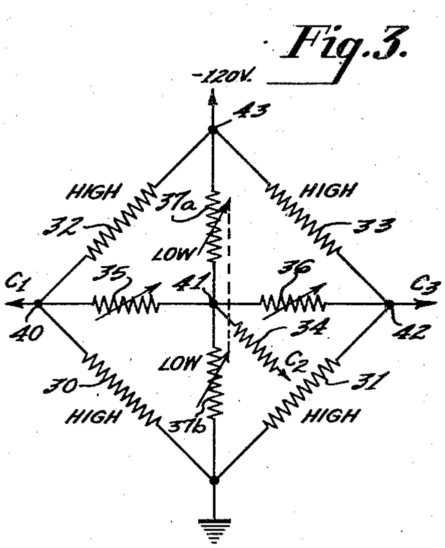
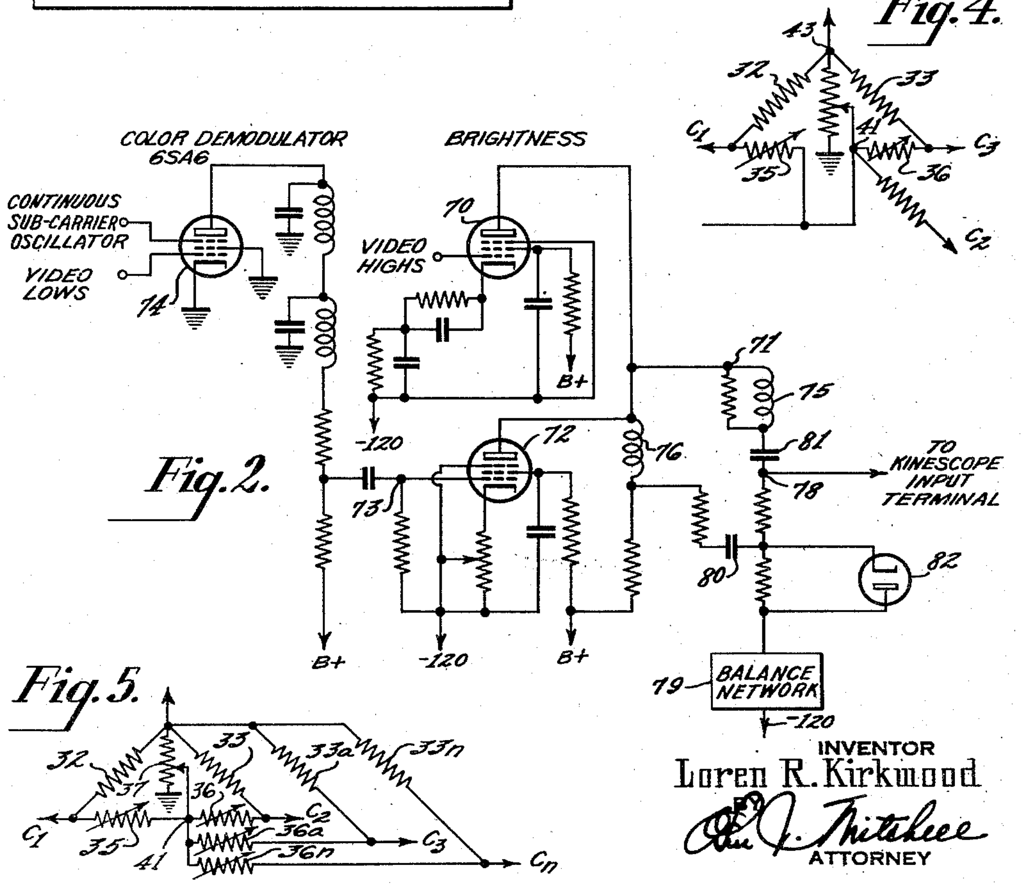
Fig. 6. Fig. 3. Fig. 4. Fig. 2. Fig. 5.
INVENTOR
Loren R. Kirkwood
BY
ATTORNEY 2,804,496
Patented Aug. 27, 1957

2,804,496

BACKGROUND CONTROL FOR COLOR TELEVISION RECEIVER

Loren R. Kirkwood, Haddonfield, N. J., assignor to Radio Corporation of America, a corporation of Delaware Application February 12, 1952, Serial No. 271,163

4 Claims. (Cl. 178—5.4)

This invention relates to electrically balanced control means for a plurality of channels and in particular it relates to control networks for background control in television systems and the like.

Heretofore it has been difficult to adjust a plurality of television channels for the same background setting when both a plurality of individual controls and a master control is provided. This is caused by interaction between the controls. The problem becomes serious when picking up a television program using several cameras located at different locations and under different lighting conditions. Under such circumstances the background level is different for some of the cameras. Because the setting of the individual background control for each camera would disturb the electrical balance of the overall master background setting, and conversely the master background setting disturbs the electrical balance of the individual background control settings it is difficult to readily adjust the controls to meet varying conditions for uniformity of background level in the short amount of time generally available to the engineer.

A primary object of this invention is to provide master control and individual channel control having no interaction.

A similar electrical balancing problem is encountered in color television systems. Color balance requirements in each of the color channels require individual background settings for the red, blue and green signal channels. The individual control settings in a conventional system contribute to the master background level, and accordingly the balance is disturbed by either a setting of the master background control or the individual background control.

Another object of the invention is to maintain independent background control settings for a plurality of color channels and a simultaneous control of all the channels without interaction between the control settings.

Thus an impedance network is provided by the invention having a plurality of separate independently variable impedance arms each adapted for individual control of a corresponding channel and variable without interaction with the setting of a further variable impedance arm adapted for simultaneous control of all the channels.

In one of the forms of the present invention there is provided a bridge network having substantially equal value high impedance arms. A relatively low impedance resistance branch is then connected across one diagonal of the bridge. This diagonal is provided with a moveable resistance tap. A voltage supply is then connected across the termini of the tapped resistance diagonal. By returning both of the termini of the other bridge diagonal to the potentiometer tap through suitable resistances, a master control circuit of the type described is provided.

Other objects of this invention and its mode of constructure will become more fully understood by considering the following detailed description together with the accompanying drawings in which:

Figure 2 is a schematic circuit diagram illustrating circuit details of a portion of the television receiver of Figure 1;

Figures 3, 4 and 5 are schematic diagrams of bridge circuits constructed in accordance with different embodiments of the invention; and Figure 6 is a diagrammatic sketch of a monitoring control panel illustrating the general manner of control to which the invention is directed.

Figure 1:
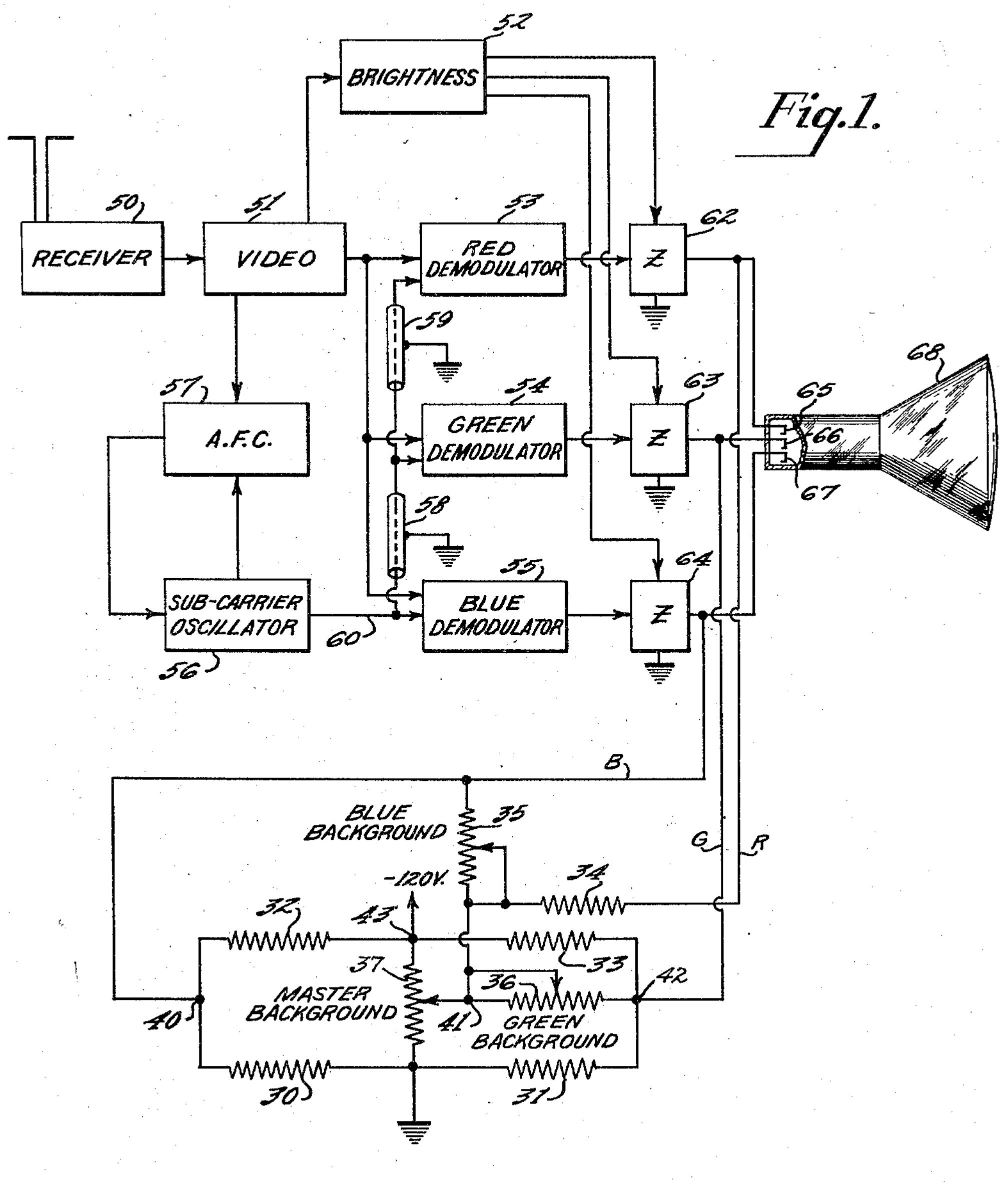
Figure 1 is a combined schematic and block diagram of a color television system embodying the teachings of this invention.

The invention as applied to the color television receiver is illustrated in the diagram of Figure 1. Therein a color receiver 50 having a video output stage 51 provides signals for the brightness channel 52 and the individual red, green and blue color channels 53, 54 and 55, in accordance with well known color television principles. The brightness channels include the mixed high frequency components of the color signals, and the respective color channels utilize the low frequency video color information.

The color signals are demodulated in the color channels 53, 54 and 55 by means of the subcarrier oscillator 56 which is maintained in synchronism with the transmitted subcarrier frequency by comparison in the automatic frequency control circuit 57. Systems of this type are well known in the art, and may be found described in such articles as "Recent improvements in band-shared simultaneous color-television systems" published on page 1264 of the Proceedings of the I. R. E. for October 1951. Suitable delay means 58 and 59 connected in the output lead 60 of the subcarrier oscillator provide the proper phase at each of the color channels for continuous demodulation of the respective video components corresponding to the respective color information in the red, green and blue color channels. The color and brightness video signals are respectively combined in the output impedance networks 62, 63 and 64, to which three input electrodes 65, 66 and 67 of suitable color reproducing means such as the three-color kinescope 68 are connected.

Because of different emission characteristics of the kinescope color guns, the different brightness levels of the colored phosphors or other varying conditions of the system, individual background control is desirable in each of the color channels. In this embodiment of the invention control of kinescope bias in each of the three kinescope guns 65, 66 and 67 is effected by a bridge network similar to that described later in connection with Figure 3. Thus the 120 volt bias potential at terminal 43 is utilized to effect at the bridge network terminals 40, 41 and 42 a suitable voltage for variably biasing the individual kinescope input electrodes 65, 66 and 67.

It has been found that where it is desired to keep the red chanel arbitrarily at unity and respectively adjust the green and blue channels to maintain relative background levels of .6 and .5 that the resistance values in maintaining bridge balance without disturbance by either master or independent background control settings are as listed in the following table:

| | Ohms |
|---|---|
| R30 | 220,000 |
| R31 | 220,000 |
| R32 | 220,000 |
| R33 | 220,000 |
| R34 | 22,000 |
| R35 | 73,330 |
| R36 | 110,000 |
| R37 | 4,000 |

In order that the relationship between the impedance networks 62, 63 and 64 and the balance bridge network might be more readily understood, a more detailed schematic diagram of one impedance network is shown in Figure 2. It is seen that the brightness channel includes video amplifier tube 70 which has its anode connected to the impedance network at terminal 71. Likewise the color channel has a video amplifier tube 72 with its anode terminal connected to the same terminal 71 on the output impedance network. Color input signals are inserted at the grid input terminal 73 of color tube 72 after demodulation by the color detector tube 74 in the manner briefly described above and well known in the art.

In the impedance network the usual peaking coils 75 and 76 are provided so that the kinescope input terminal may be connected to the network at terminal 78. The biasing circuit found in the balance network 79, heretofore described in detail in connection with Figure 1, is isolated from the impedance network for direct current by capacitors 80 and 81 in this embodiment of the invention. A direct current restoring diode 82 is provided in the direct current output circuit. The color and brightness video signal components may be provided at each kinescope input terminal by the respective output impedance networks associated with the particular color channel. In this embodiment of the invention therefore the background adjustment is provided by controlling the direct current bias in each of three kinescope color channels, although those skilled in the art could readily adapt the invention to provide variable impedance or attenuation control of background setting levels.

Therefore in accordance with the invention improved control means is provided for adjusting the background of a plurality of television channels both simultaneously and independently while maintaining a balanced relationship and preventing interaction between the controls.

To enable the independent background control settings without interaction, the simplified schematic drawing of the bridge circuit of Figure 1 is shown in Figure 3 as provided in accordance with the invention together with modifications thereof shown schematically in Figures 4 and 5. Thus by selecting four equal high impedance ratio arms 30, 31, 32 and 33 shown in Figure 3 to form a four element bridge, a balanced condition may be made at terminals 40, 41 and 42 with respect to the potential or impedance presented by the relatively low impedance guard circuit 37*a* and 37*b*. In this respect the potential at terminal 41 will be higher than that at terminals 40 or 42 and any change in setting of the master background control impedance 37*a* and 37*b* will cause a relatively large change in potential of terminal 41 as compared with the change in potential at terminals 40 and 42. By connecting a first channel $C_2$ to the intermediate terminal 41 of the coupling circuit 35, 36 the background of channel $C_2$ will depend upon the voltage or impedance between terminal 41 and ground. The potential at terminals 40 and 42 likewise varies. Thus the guard circuit comprising the variable resistance sections 37*a* and 37*b* may be adjusted to provide a master background control for simultaneously adjusting each of the control channels. Preferably the master background control means is a potentiometer, such as 37 of Figure 1, having the variable tap connected to terminal 41. For purpose of simplicity in illustrating the bridge circuit operation, the potentiometer is drawn as the separate ganged variable resistors 37*a* and 37*b*.

For individual control of channels $C_1$ and $C_3$ relative to channel $C_2$ the independent variable resistors 35 and 36 are provided. When the potentiometer 37 is selected to have a low impedance as compared with the high impedance of the bridge ratio arms 30, 31, 32 and 33, the relative adjustment of the variable resistors 35 and 36 will not disturb the voltage or impedance at terminal 41. However, the impedance or potential between the respective channels $C_1$ or $C_3$ and ground will be directly dependent upon the setting of the individual background controls 35 and 36 because of the isolation afforded by the bridge ratio arm resistors 30, 31, 32 and 33. Accordingly the relative background settings of channels $C_1$, $C_2$ and $C_3$ may be readily adjusted without disturbing the electrical or impedance balance of the bridge network. Conversely the master background control 37 may be adjusted without electrically unbalancing the setting of the individual channels.

As shown in Figure 4, the ratio arm resistors need not be equal. Thus, when balance is required about the potential of the guard circuit terminal 43 the ratio arms 30 and 31 may be infinite in resistance without resulting in electrical unbalance. The circuit of Figure 3 is preferred if the balance condition preferred is near the mid-potential between terminal 43 and ground. Conversely the arms 32 and 33 may be made infinite if the desired control range is near ground potential.

As above indicated a greater control range is effected at terminal 41 of the bridge network than at terminals 40 and 42. When a greater range is not needed for one channel the circuit of Figure 5 may be utilized. Channels $C_1$, $C_2$ and $C_3$ all vary in amounts determined by the relative settings of the variable background control resistors 35, 36 and 36*a*, and as long as these resistors are of the same order of resistance the variation of one channel with respect to another with a change in setting of the master background control 37 is approximately the same.

Also the embodiment of Figure 5 indicates the manner in which more than three channels are independently varied in accordance with the invention. Additional channels $C_n$ may by the addition of further bridge sections 33*n* be connected for independent control by the control resistor 36*n* without electrical unbalance of the bridge network. It is noted that the overall impedance of all the parallel resistors 33, 33*a*–33*n* must be large as compared to the impedance of resistor 37 to prevent any change of master control setting with changes in setting of the individual channel control settings.

For simultaneous and separate control of a plurality of television channels at a transmitting monitoring station in accordance with the present invention consider the bridge circuits of Figures 3, 4 and 5 together with the diagrammatic representation of the monitoring control panel shown in Figure 6.

It is desirable to maintain the signals on each of the monitoring kinescopes $C_1$, $C_2$ and $C_3$, corresponding respectively to three separate television cameras, at respective levels affording identical background characteristics so that there is transmitted a program without brightness component alterations when different cameras are used. Therefore arbitrarily selecting center channel $C_2$ to have a unity background level, channels $C_1$ and $C_3$ may be relatively adjusted by means of control knobs 10 and 11 to have identical background levels when the circuits of Figures 3 and 4 are used. These adjustments are provided in accordance with the present invention so that their adjustment does not disturb the background of channel $C_2$ or which may initially be determined by the master background control 12. Likewise the setting of the master background control 12 to simultaneously vary the backgrounds of channels $C_1$, $C_2$ and $C_3$ does not interact to disturb the relative background settings of the individual background controls 10 and 11, with respect to channel $C_2$.

It is therefore seen that the channel selector switch 14 may be used to select the individual desired channel and the individual background controls 10 and 11 may be set to choose a background level of the program to be transmitted on each camera so that any change of cameras will not disturb the direct current level of the transmitted program. In this manner the operator may at any time he sees a change in background setting due to lighting conditions or individual camera response characteristics adjust the individual background for optimum performance.

When more than three channels need be controlled or when one channel ($C_2$) is not arbitrarily chosen at a unity brightness level for comparison with the remaining channels ($C_1$ and $C_3$) the embodiment of Figure 5 is preferred. In this case the additional control knob 15 is afforded for individual background control of channel $C_2$.

It is therefore evident in view of the foregoing description of the invention that a balanced bridge network is provided in accordance with the invention having independent variable impedance sections connected for independent control of a plurality of signal channels and a master control variable impedance section for simultaneous control of all said channels, wherein each variable impedance setting is independently adjustable without disturbing the electrical balance of any other variable impedance setting. Therefore having described the construction of the invention and its mode of operation, those features of novelty believed descriptive of the nature of the invention are defined with particularity in the appended claims.

What is claimed is:

1. In a voltage magnitude control system for a plurality of electrical utilization means, each utilization means having a voltage control input terminal, the combination of: a source of electrical potential; an electrical network circuit including four impedance arms connected to define a bridge circuit having a first and second set of access terminals, each set of access terminals defining a separate diagonal of said bridge circuit; connections between said first terminal set and said source of electrical potential; a tapped voltage dividing system connected across said potential source; means included in said voltage dividing system defining a manually adjustable tap thereon and for adjusting the effective position of said tap thereon; a first manually controllable variable impedance element connected between one terminal of said second terminal set and said voltage divider tap; a second manually controllable variable impedance element connected between the other terminal of said second impedance set and said voltage divider tap; a connection from one terminal of said second terminal set to one of said utilization means voltage control input terminals; a connection from the other terminal of said second terminal set to another utilization means voltage control input terminal; and impedance means connected from said voltage divider tap to still another of said utilization means voltage input terminals.

2. A voltage magnitude control system, according to claim 1, wherein said impedance arms are of substantially higher impedance value than said voltage dividing means.

3. A voltage magnitude control system, according to claim 1, wherein two of said impedance arms each connected between one of said first set of access terminals and a different one of said second set of access terminals is substantially infinite in impedance value.

4. In a color television system, the combination of: a plurality of color reproducing channels each having an input terminal designated to receive a respective bias voltage for determining background brightness of the image reproduced by each channel; a source of bias voltage; an electrical bridge type resistance network having a first and a second set of two diagonally disposed terminals; means connecting said first terminal set across said source of bias voltage; a first and a second galvanically conductive variable impedance means each having a first and a second connection terminal between which is defined an electrical impedance; means connecting the first terminal of each of said first and second impedance means to one terminal of each of said first and second terminal sets; means connecting the second terminal of each of said first and second impedance means to one another to define a common connection terminal; a third and fourth galvanically conductive impedance means each having a first and a second connection terminal between which is also defined an electrical impedance; means connecting the first terminal of each of said third and fourth impedance means to the other terminal of each of said first and second terminal sets; means connecting the second terminal of each of said third and fourth impedance means to said common connection terminal; a resistor connected between said common connection terminal and one of said color channel input terminals; and connections from each of the two terminals comprising said second set of diagonally disposed terminals to respectively different ones of said other color channel input terminals.

References Cited in the file of this patent

UNITED STATES PATENTS

| | | |
|---|---|---|
| 2,406,760 | Goldmark | Sept. 3, 1946 |
| 2,489,328 | Salinger | Nov. 29, 1949 |
| 2,525,425 | Reynst | Oct. 10, 1950 |
| 2,566,693 | Cherry | Sept. 4, 1951 |

FOREIGN PATENTS

| | | |
|---|---|---|
| 443,896 | Great Britain | Mar. 10, 1936 |